INVENTOR
WALTER FERRIS

INVENTOR
WALTER FERRIS
BY
Wesley P. Merrill
ATTORNEY

Sept. 6, 1955  W. FERRIS  2,716,944
MECHANISM FOR PUMPING A LIQUID
AND A LUBRICANT SIMULTANEOUSLY
Filed May 24, 1954  7 Sheets-Sheet 4

INVENTOR
WALTER FERRIS
BY
*Wesley F. Merrill*
ATTORNEY

Sept. 6, 1955   W. FERRIS   2,716,944
MECHANISM FOR PUMPING A LIQUID
AND A LUBRICANT SIMULTANEOUSLY
Filed May 24, 1954   7 Sheets-Sheet 5
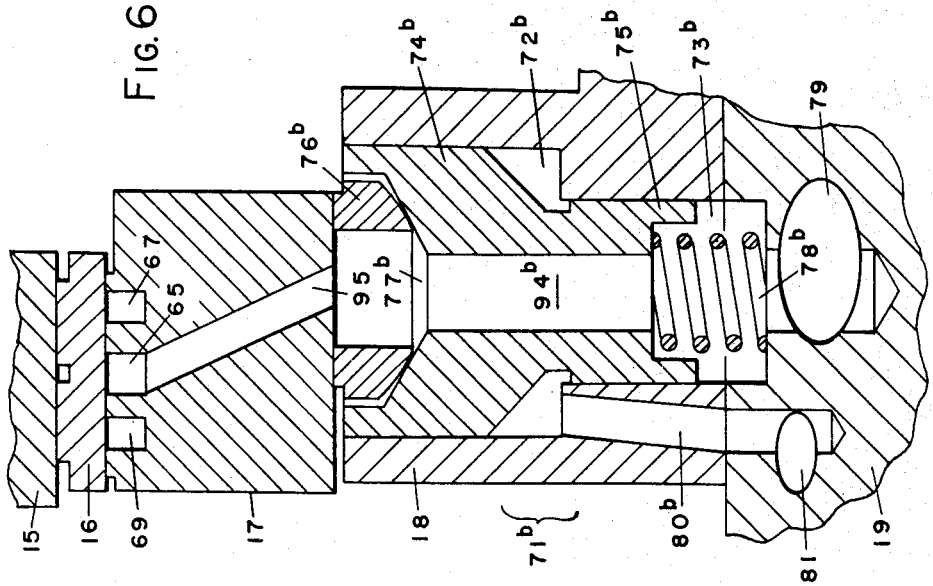
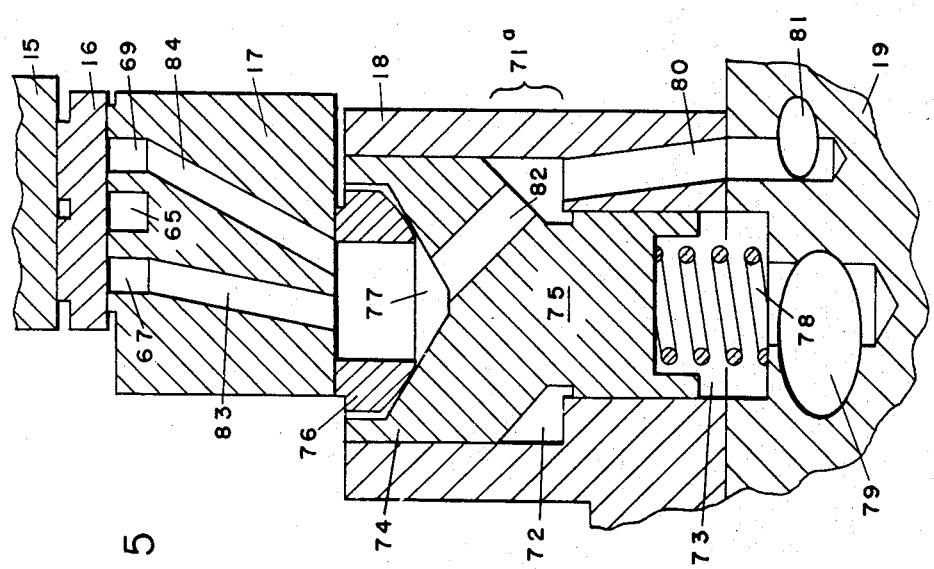
INVENTOR
WALTER FERRIS
BY
Wesley P. Merrill
ATTORNEY Sept. 6, 1955 W. FERRIS 2,716,944
MECHANISM FOR PUMPING A LIQUID
AND A LUBRICANT SIMULTANEOUSLY
Filed May 24, 1954 7 Sheets-Sheet 6
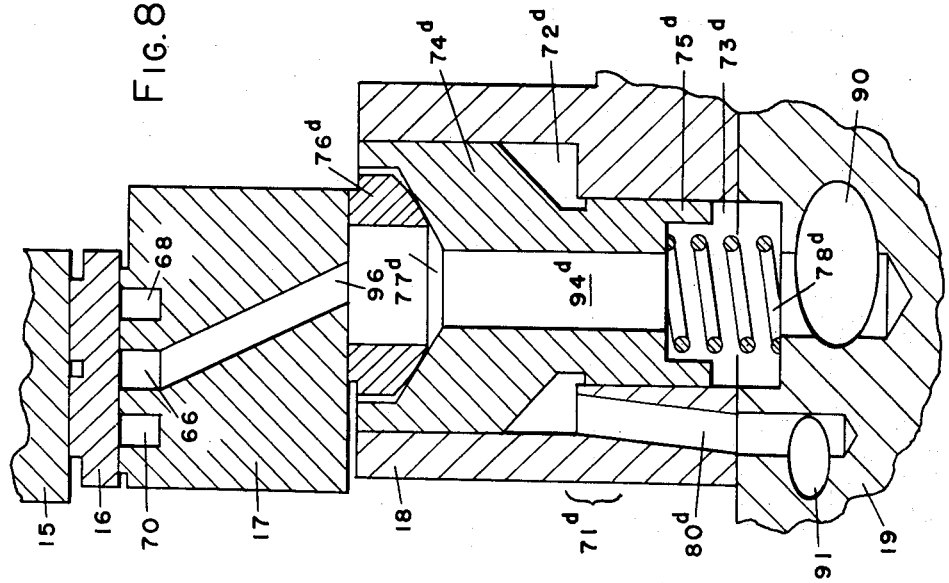
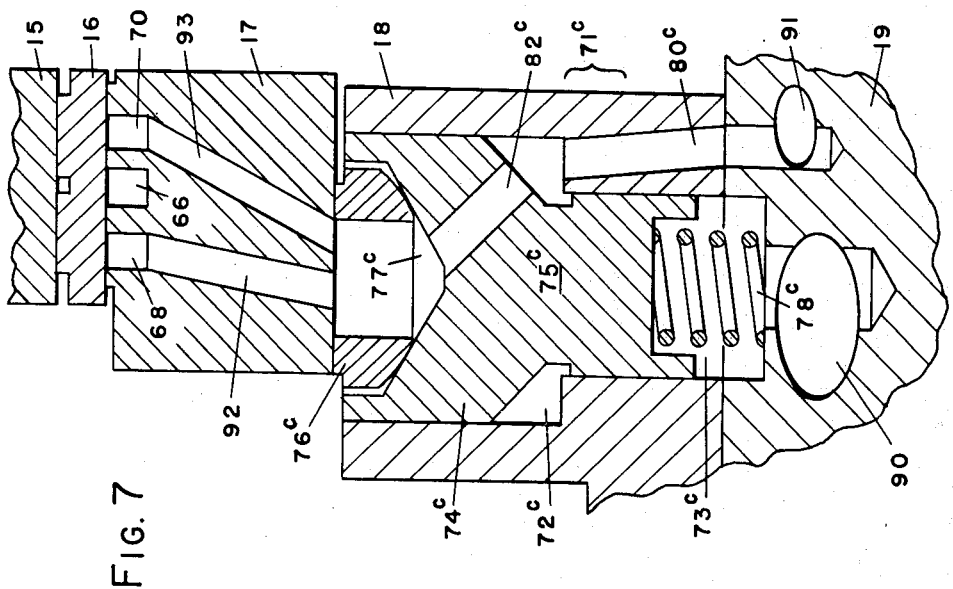
INVENTOR
WALTER FERRIS
BY
*Wesley P. Merrell*
ATTORNEY

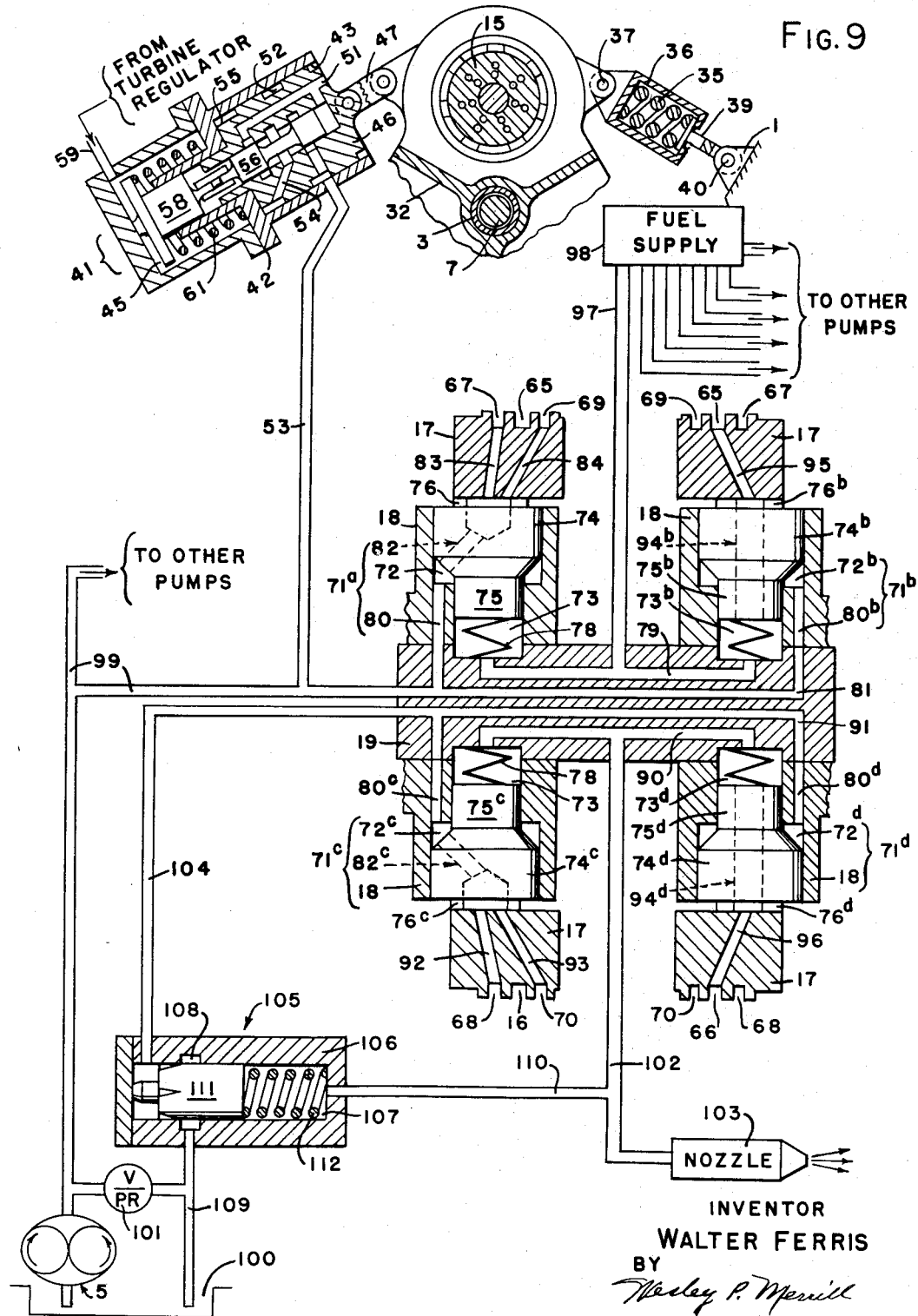

United States Patent Office 2,716,944
Patented Sept. 6, 1955

2,716,944

MECHANISM FOR PUMPING A LIQUID AND A LUBRICANT SIMULTANEOUSLY

Walter Ferris, Milwaukee, Wis., assignor to The Oilgear Company, Milwaukee, Wis., a corporation of Wisconsin Application May 24, 1954, Serial No. 431,660

20 Claims. (Cl. 103—2)

This invention relates to pumps of the type employed to pump liquid which causes excessive wear of the moving parts of the pump if allowed to come in contact therewith, such as non-lubricating liquids and liquids containing foreign matter.

A pumping mechanism constructed according to the invention is particularly adapted for supplying fuel oil to a turbine and the invention will be explained as being embodied in a pumping mechanism for that purpose but it is to be understood that the invention is not limited to that particular use but may be embodied in pumping mechanisms for other purposes.

An object of the invention is to provide a pumping mechanism which will pump non-lubricating liquid or liquid containing foreign matter and which will remain in good operating condition and be capable of creating the necessary pressures for a much longer period of time than the pumps heretofore used for that purpose.

Another object is to provide a pumping mechanism comprising a plurality of individual pumps which are arranged in a compact unit and are driven and controlled simultaneously.

Other objects and advantages will appear from the description hereinafter given of a pumping mechanism in which the invention is embodied.

According to the invention in its principal aspect, a pump has a rotatable cylinder barrel which contains a plurality of cylinders and pistons for transferring a main volume of liquid from a source of supply to a point of use and a plurality of pistons and cylinders for pumping a secondary volume of lubricant, a valve which engages the cylinder barrel and controls the flow of liquid and lubricant to and from the respective cylinders, the inlet and discharge pressures of the lubricant are maintained respectively somewhat higher than the inlet and discharge pressures of the liquid, and the valve is so constructed that the lubricant prevents the lower pressure liquid from seeping between the mating surfaces of the valve and the cylinder barrel.

According to the invention in another aspect, the pump valve is flat and engages the end of the cylinder barrel, the inlet half of the valve is urged against the cylinder barrel by the inlet pressures of both the liquid and the lubricant, and the discharge half of the valve is urged against the cylinder barrel by the discharge pressures of both the liquid and the lubricant.

The invention is exemplified by the pumping mechanism shown in part schematically in the accompanying drawings in which the views are as follows.

Figure 4:
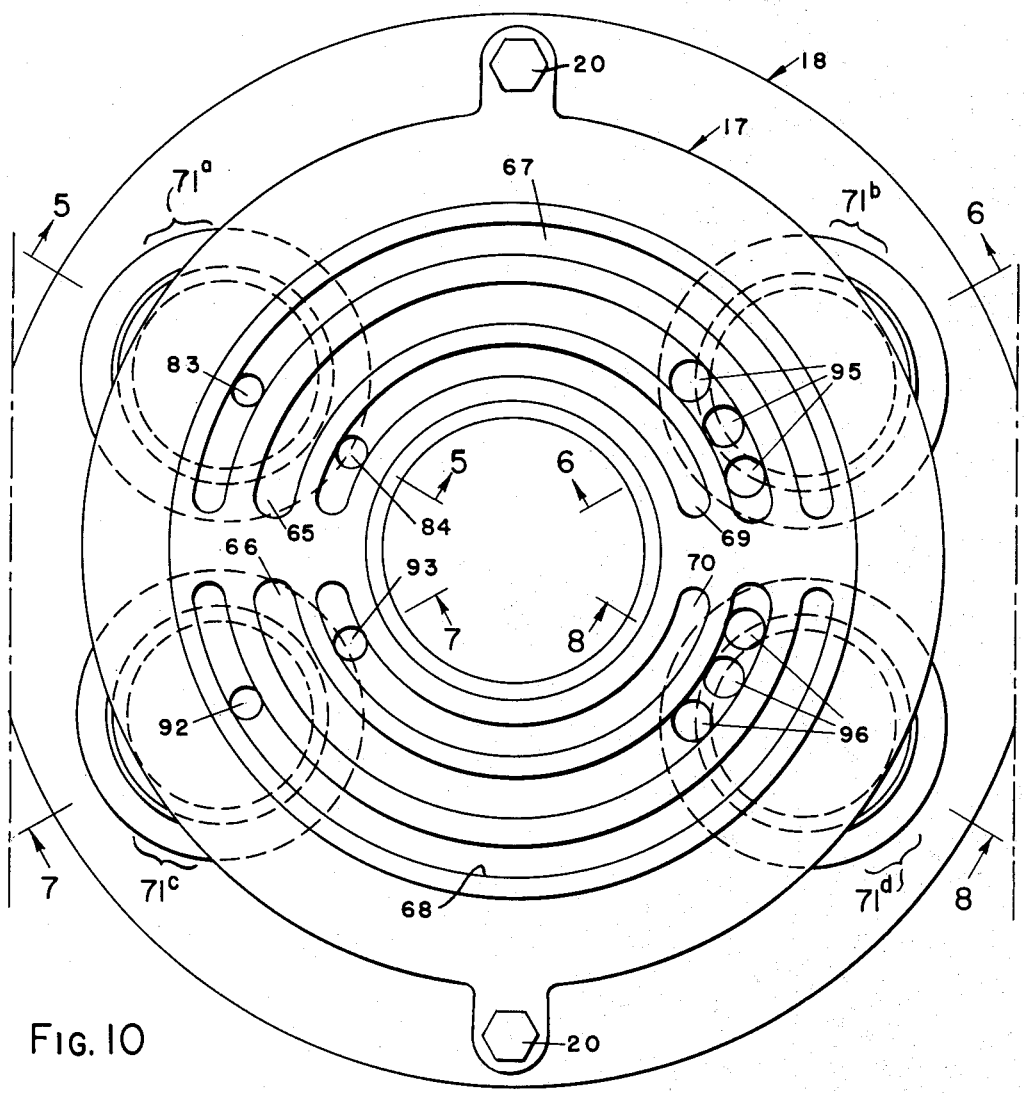
Fig. 4 is a face view of a valve which controls the flow of liquid and lubricant to and from the cylinders of one pump, the view being taken in the plane indicated by the line 4—4 of Fig. 3 but drawn to a still larger scale.

Figs. 5, 6, 7 and 8 are sections taken through the valve and portions of the adjacent parts on the lines 5—5, 6—6, 7—7 and 8—8 respectively of Fig. 4.

Figure 1:
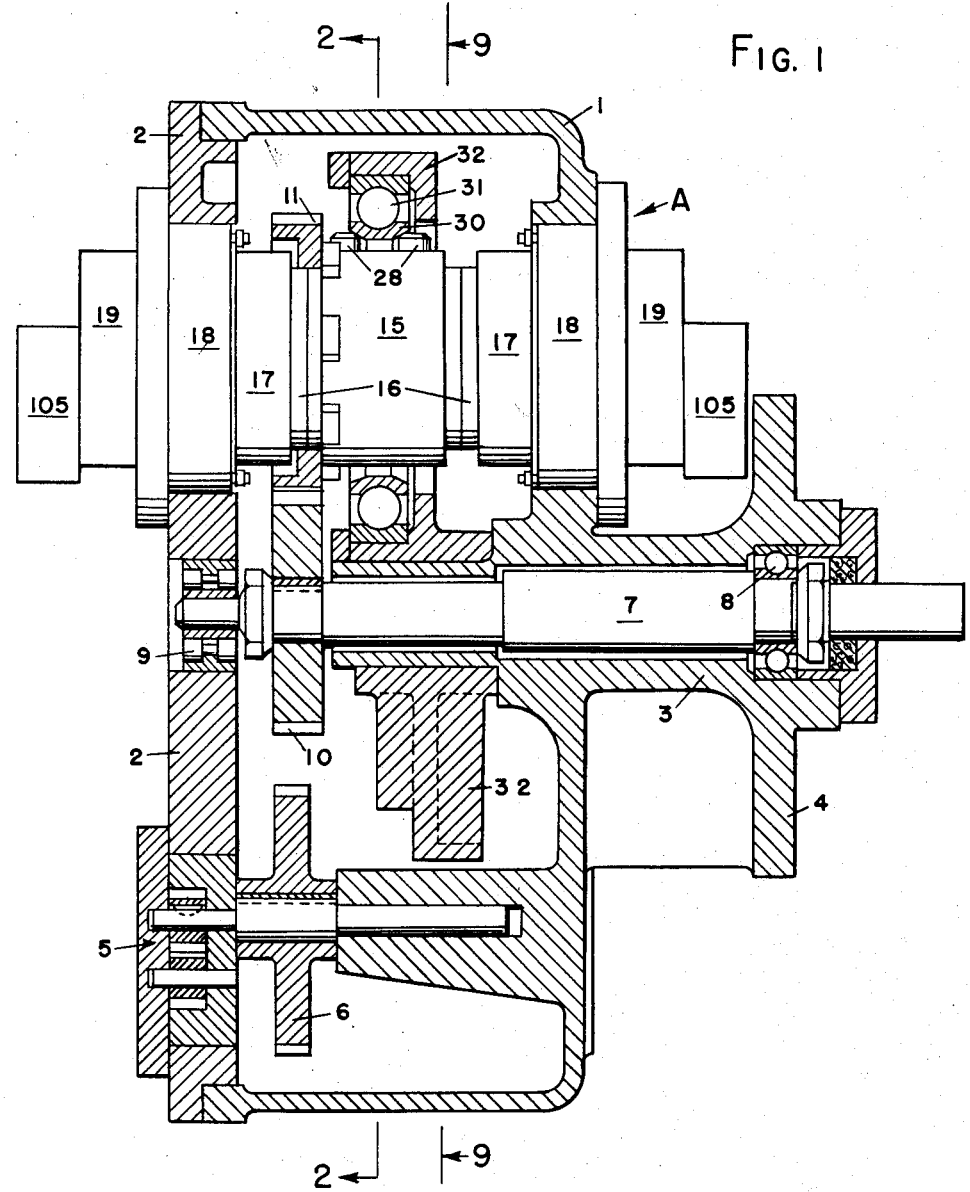
Fig. 1 is a central longitudinal section, partly in full, taken through a pumping mechanism in which the invention is embodied and which includes three pumping units of two pumps each, the plane of the view being indicated by the line 1—1 of Fig. 2.

Fig. 9 is a diagram illustrating the hydraulic circuit of one of the pumps and the circuit for the mechanism which varies the displacement of all of the pumps, the portion of the pumping mechanism shown at the top of the figure being a view taken in the plane indicated by the line 9—9 of Fig. 1 but drawn to a small scale.

Figure 10:
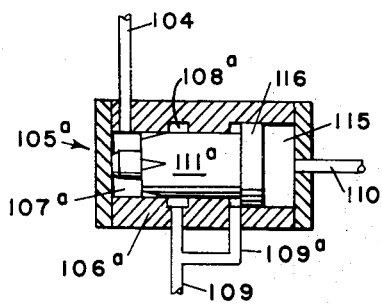

Fig. 10 is a view illustrating a modification of the pressure regulating valve shown in Fig. 9.

For the purpose of illustration, the invention has been shown as being embodied in a pumping mechanism comprising three identical pumping units A, B and C (Fig. 2) each of which consists of two pumps but the mechanism may comprise a different number of pumps or a single pump as circumstances may require.

As shown, the three pumping units are arranged partially within and are supported by a casing 1 having an open front end which is closed by a removable front plate 2. The rear wall of casing 1 is provided with an integral hollow hub 3 (Fig. 1) which extends from both sides thereof and has at its outer end an integral flange 4 by means of which casing 1 may be fastened to a support, such as a part of a turbine. Front plate 2 has arranged therein a lubricant supply pump 5 (shown as a gear pump) which is driven by a gear 6.

Hub 3 encloses the greater part of a drive shaft 7 which is supported by two bearings 8 and 9 arranged in hub 3 and in end plate 2 respectively. Shaft 9 has fixed thereon a gear 10 which drives pumping units A, B and C directly and gear pump 5 indirectly. Fig. 1 shows gear 10 in mesh with a gear 11 which is fixed to and forms a part of pumping unit A. However, all three pumping units are alike and each includes a gear 11 which meshes with gear 10 and the gear 11 on unit B meshes with gear 6, as indicated in dotted lines in Fig. 2 so that all three units and pump 5 are driven simultaneously when shaft 7 is rotated.

Each of the three pumping units comprises two independently functioning pumps which are alike but are opposite hand to each other. Since the pumping units are alike, a description of one will suffice for all and, since the two pumps of each unit are alike, corresponding parts of the two pumps will be indicated by corresponding reference numerals.

Figure 3:
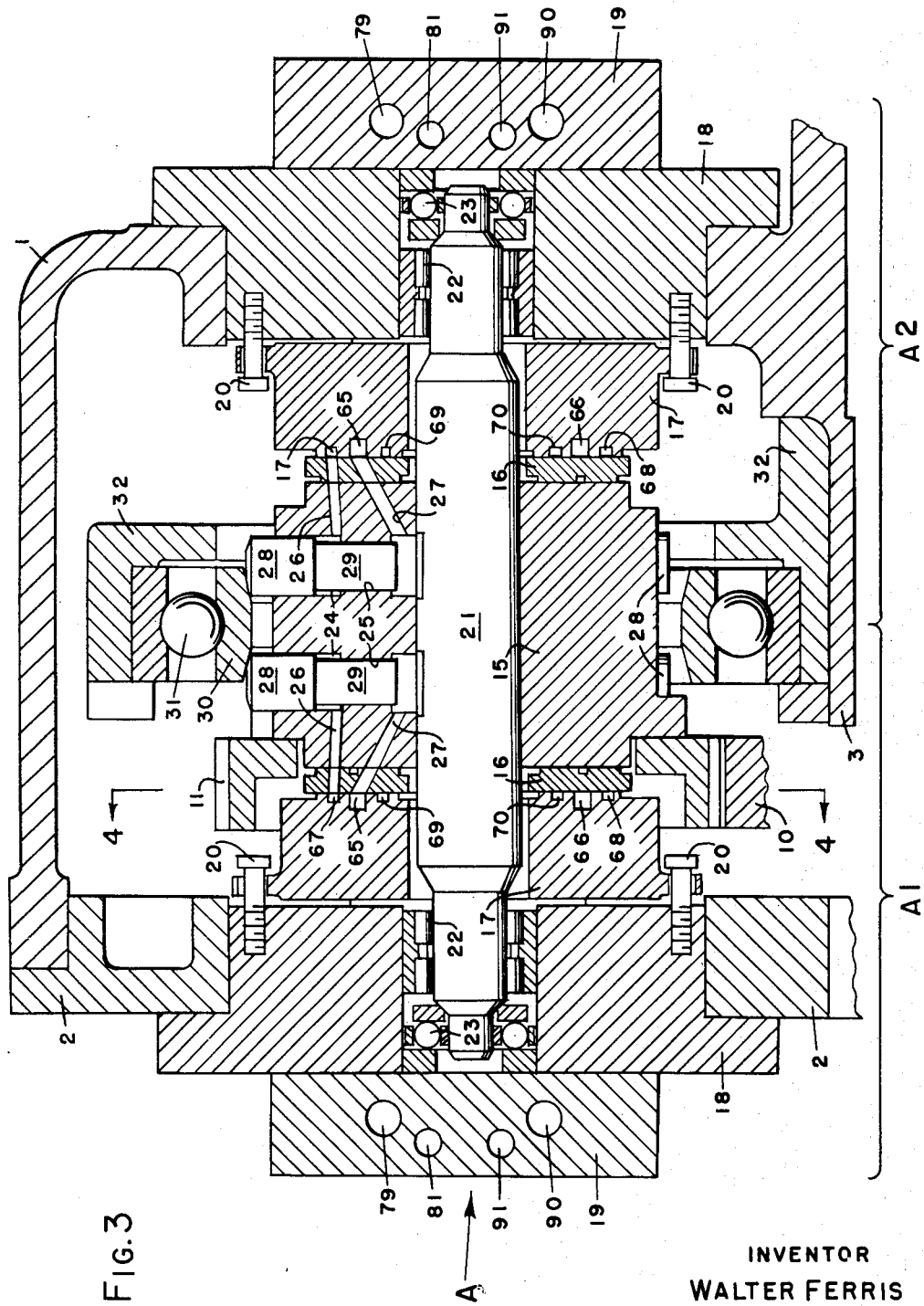
Fig. 3 is a longitudinal section taken through one of the pumping units shown in Fig. 2, the view being taken in the same plane as Fig. 1 but drawn to a larger scale.

As shown in Figs. 1 and 3, unit A includes a cylinder barrel 15 to which one of the gears 11 is fastened and which preferably has a wear plate 16 fixed to each of its ends to form a part thereof, two annular valves 17 which engage the outer faces of the two wear plates respectively, two end heads 18 which are arranged at the outer ends of the two valves and two manifolds 19 each of which is fixed to the outer face of an end head. One end head 18 is closely fitted in and fastened to the rear wall of casing 1 and the other end head 18 is closely fitted in and fastened to front plate 2. Each valve 17 has been shown as being supported upon two bolts 20 which are threaded into the adjacent end head 18 at diametrically opposite points and extend loosely through suitable lugs formed on the valve so that the valve is restrained from radial and rotary movements but can have enough axial and tilting movements to permit its face to be held in uniform contact with the face of the adjacent wear plate 16.

Cylinder barrel 15 is fixed upon a shaft 21 which is rotatably supported by two bearings 22 and is restrained from axial movement by two bearings 23, one bearing 22 and one bearing 23 being arranged in each of the two end heads 18. Cylinder barrel 15 has formed therein in two circular rows a plurality of compound cylinders each of which includes an outer cylinder 24 and an inner cylinder 25 which is smaller in diameter than cylinder 24 and is concentric therewith. Each cylinder 24 in each row communicates at its inner end with a passage 26 which extends therefrom through the adjacent end of the cylinder barrel and through the wear plate 16 fixed thereto. Each cylinder 25 in each row communicates at its inner end with a passage 27 which extends therefrom through the adjacent end of the cylinder barrel and through the wear plate 16 fixed thereto. The outer ends of passages 26 and 27 constitute cylinder ports which cooperate with valve ports formed in valve 17 as will presently be explained.

Each compound cylinder 24—25 has fitted therein a compound piston consisting of an outer piston 28, which is fitted in the cylinder 24, and an integral piston 29 which is fitted in the cylinder 25. The outer ends of pistons 28 engage an annular thrust member 30 which is rotatably supported as by means of a ball bearing 31 and is eccentric to cylinder barrel 15 when the unit is pumping liquid.

Figure 2:
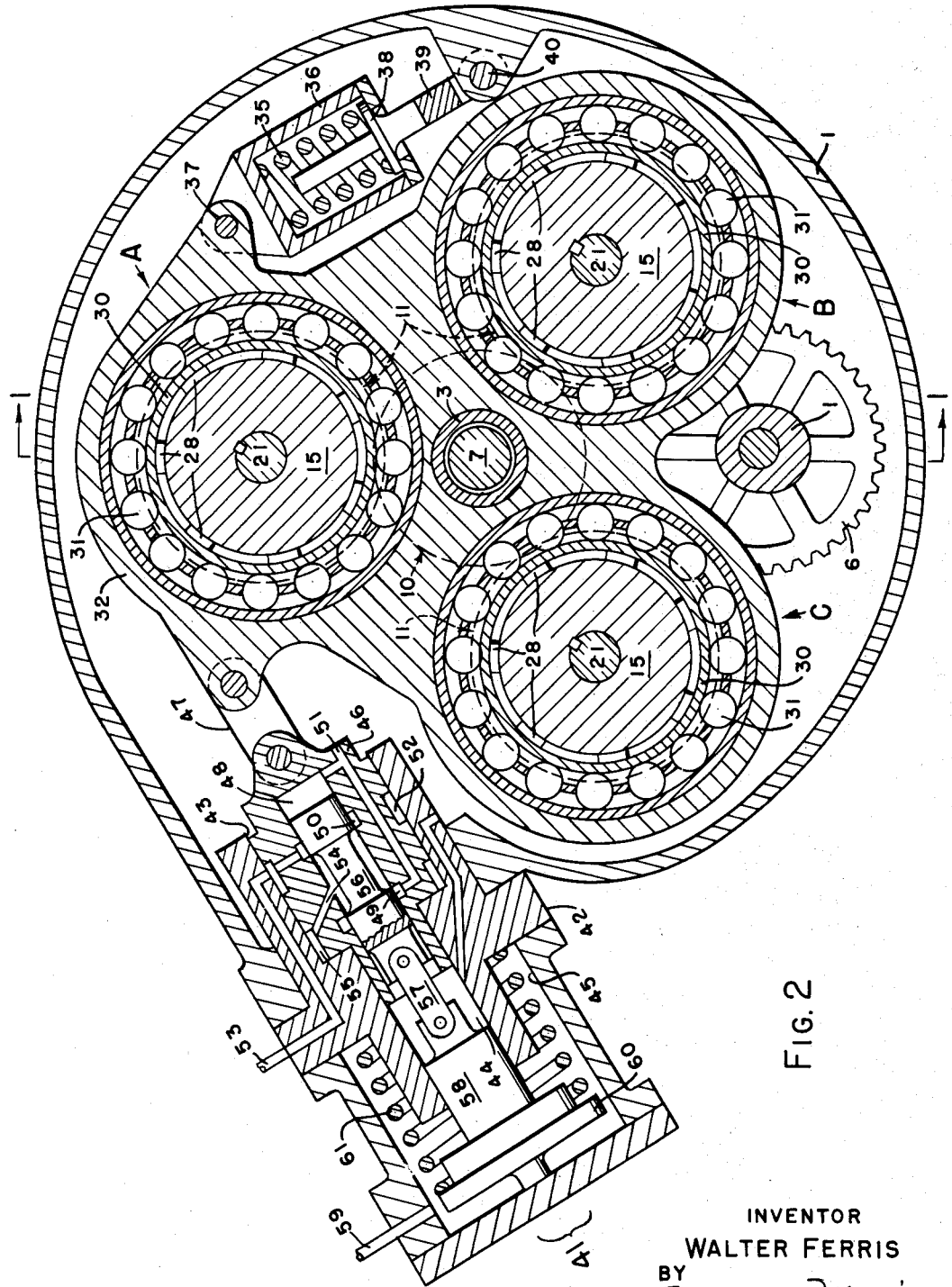
Fig. 2 is a transverse section taken on the line 2—2 of Fig. 1.

Ball bearing 31 is fixed in and carried by a displacement varying member 32 which is journaled upon hub 3 and also carries the thrust members 30 and ball bearings 31 of pumping units B and C as shown in Fig. 2. Member 32 is urged toward and normally held in its neutral or zero displacement position, in which each thrust member 30 is concentric with the corresponding cylinder barrel 15 as shown in Fig. 3, by a caged spring 35 arranged in a cylinder 36 which is pivoted to member 32 by a pin 37. Spring 35 has one of its ends in engagement with the end wall of cylinder 36 and its other end in engagement with a flange 38 formed on a rod 39 which is pivoted to casing 1 by a pin 40.

Member 32 is adapted to be rotated upon hub 3, to thereby vary the displacements of the several pumps, by a servo-motor 41 which is energized by liquid supplied thereto from a suitable source, such as gear pump 5, and which operates in response to a signal from an outside source such as the fuel regulator of a turbine.

As shown in Fig. 2, servo-motor 41 has its mechanism arranged within a body 42 which is fixed to casing 1 and has a large cylinder 43, a small cylinder 44 and a spring chamber 45 formed therein. Cylinder 43 has fitted therein a piston 46 which is pivotally connected by links 47 to displacement varying member 32 at the side of unit A opposite to pin 37.

Piston 46 has an axial bore 48 formed therein and two annular grooves or ports 49 and 50 are formed in the wall of bore 48. Port 49 communicates with a drain passage 51. Port 50 communicates with an annular groove 52 which is formed in the peripheral surface of piston 46 and communicates with a channel 53 which is supplied with liquid from lubricant pump 5 as will presently be explained. The part of bore 48 between ports 49 and 50 is connected by a passage 54 to an annular groove 55 which is formed in the peripheral surface of piston 46 and communicates at all times with the inner end of cylinder 43.

Communication between passage 54 and either of ports 49 and 50 is controlled by a pilot valve 56 which is fitted in bore 48 and shown as having two pistons which are spaced apart a distance exactly equal to the distance between the adjacent edges of ports 49 and 50 so that valve 56 normally blocks both of the ports but a slight movement of valve 56 in one direction or the other will open one or the other of ports 49 and 50 to passage 54.

Pilot valve 56 is connected by links 57 to a pilot piston 58 which is fitted in bore 44 and subjected to any pressure in spring chamber 45 to which pressure fluid may be supplied through a channel 59. Piston 58 is provided on its outer end with a spring retainer 60 to support one end of a spring 61 which has its other end in contact with one end wall of chamber 45 and which normally holds retainer 60 against the other end of chamber 45.

The arrangement is such that when the pressure in channel 59 exceeds a given value as determined by the resistance of spring 61, fluid will flow therefrom into chamber 45 and cause piston 58 to move pilot valve 56 toward the right in respect to Fig. 2. As soon as valve 56 starts to move, it will open port 50 to passage 54 and then liquid will flow from channel 53 through groove 52, port 50, bore 48, passage 54 and groove 55 into the inner end of cylinder 43 and cause piston 46 to move with valve 56 and to rotate displacement varying member 32 in a clockwise direction upon hub 3, thereby increasing the displacements of pumping units A, B and C.

As soon as movement of pilot valve 56 ceases due to cessation of flow of fluid into chamber 45, piston 46 will move port 50 out of communication with passage 54 which will stop further movement of piston 46. Then as long as there is no flow of fluid into or out of chamber 45, pilot valve 56 will remain stationary, piston 46 will be held stationary by the liquid trapped in the inner end of cylinder 43, and piston 46 will hold displacement varying member 32 in its adjusted position.

When the pressure in channel 59 drops below the given value, spring 61 will cause piston 58 to move toward the left in respect to Fig. 2 and will eject fluid from chamber 45 into channel 59. Pilot valve 56 will move with piston 58 and, as soon as it starts to move, it will open port 49 to passage 54 which will permit caged spring 35 to rotate member 32 counterclockwise and cause piston 46 to eject liquid from cylinder 43 through groove 55, passage 54, bore 48, port 49 and passage 51 to exhaust until piston 46 has moved the same distance that pilot valve 56 was moved and then it will close port 49 and further movement of piston 46 and member 32 will cease.

While each pumping unit has a single cylinder barrel 15, a single shaft 21, a single thrust member 30 and a single bearing 31 in order to provide a compact and economical structure, the pistons 28 and 29 in each row pump liquid independently of the pistons in the other row and the parts of each unit at opposite sides of the transverse centerline of cylinder barrel 15 (line 2—2 of Fig. 1) constitute individual pumps. In Fig. 3, the two pumps of unit A have been designated as pumps A1 and A2. Since units A, B and C are alike and since each unit consists of two pumps which are alike except for being opposite hand to each other, a description of the means for controlling the flow of liquid to and from the cylinders of pump A1 will suffice for all of the pumps.

As shown in Figs. 3 and 4, the valve 17 of pump A1 has formed in the face thereof two arcuate main ports 65 and 66, two arcuate auxiliary ports 67 and 68 which are spaced radially outward from ports 65 and 66 respectively and two arcuate auxiliary ports 69 and 70 which are spaced radially inward from ports 65 and 66 respectively. Ports 65 and 66 are the inlet and discharge ports, respectively, for fuel and they are arranged in the path of the outer ends of the passages 27 each of which registers with ports 65 and 66 alternately as cylinder barrel 15 rotates. Ports 67 and 68 are the inlet and discharge ports, respectively, for lubricant and they are arranged in the path of the outer ends of the passages 26 each of which registers with ports 67 and 68 alternately as cylinder barrel 15 rotates.

Valve 17 is urged against wear plate 16 by four hold-up motors 71$^a$, 71$^b$, 71$^c$ and 71$^d$ (Figs. 4–8) which are arranged in end head 18. As shown in Fig. 5, hold-up motor 71$^a$ includes a compound cylinder consisting of a cylinder 72 which extends into end head 18 from the inner face thereof and a smaller concentric cylinder 73 which extends from cylinder 72 through end head 18 and into manifold 19, a compound piston consisting of a piston 74 which is fitted in cylinder 72 and a piston 75 which is formed integral with piston 74 and is fitted in cylinder 73, an annular sealing member 76 which engages valve 17 and is arranged in a recess 77 formed in piston 74, and a spring 78 which is arranged in cylinder 73 and urges pistons 74—75 against sealing member 76 and sealing member 76 against valve 17.

The mating surfaces of valve 17 and sealing member 76 are made flat and smooth, the opposite face of sealing member 76 is made spherical and smooth, and the bottom of recess 77 is made conical and smooth to permit sealing member 76 to adjust itself to the surface of valve 71 and to provide substantially fluid tight joints between sealing member 76 and valve 17 and between sealing member 76 and piston 74.

Cylinder 73 communicates with a fuel inlet passage 79 which is formed in manifold 19 and to which fuel is supplied at a low pressure as will presently be explained. Cylinder 72 is connected by a passage 80 to a lubricant inlet passage 81 which is formed in manifold 19 and which is supplied with lubricant by pump 5 as will presently be explained. The arrangement is such that, when the pump is operating, spring 78 and the fuel inlet pressure act upon the end of piston 75 and the lubricant pump pressure acts upon the annular area of piston 74 which causes hold-up motor 71$^a$ to urge valve 17 against wear plate 16.

The inner portion of cylinder 72 communicates with recess 77 through a passage 82 which is formed in piston 74, and recess 77 communicates through sealing member 76 with two passages 83 and 84 which are formed in valve 17 and communicate, respectively, with valve ports 67 and 69 so that lubricant can flow from passage 81 through passage 80, cylinder 72, passage 82, recess 77, sealing member 76 and passages 83 and 84 into valve ports 67 and 69.

Hold-up motor 71$^c$ (Fig. 7) is identical to hold-up motor 71$^a$ and like parts have been indicated by like reference numerals with the exponent $c$ added to the reference numerals applied to hold-up motor 71$^c$ so that further description thereof is unnecessary. In this case, however, cylinder 73$^c$ communicates with a fuel discharge passage 90 which is formed in manifold 19 and through which pumping pistons 29 discharge fuel as will presently be explained and passage 80$^c$ communicates with a lubricant discharge passage 91 which is formed in manifold 19 and through which pumping pistons 28 discharge lubricant as will presently be explained. Also, recess 77$^c$ communicates through sealing member 76$^c$ with two passages 92 and 93 which are formed in valve 17 and communicates with valve ports 68 and 70 respectively.

The arrangement is such that, when the pump is operating, the lubricant discharged by pistons 28 into port 68 can flow therefrom through passage 92, sealing member 76$^c$, recess 77$^c$, passage 82$^c$, cylinder 72$^c$ and passage 80$^c$ into passage 91, and the lubricant discharge pressure acting upon the annular area of piston 74$^c$ and spring 78$^c$ and the fuel discharge pressure acting upon piston 76$^c$ will cause hold-up motor 71$^c$ to urge valve 17 against wear plate 16.

Since hold-up motor 71$^b$ (Fig. 6) and hold-up motor 71$^d$ (Fig. 8) are the same as hold-up motor 71$^a$ except for the passages in their pistons, a detailed description thereof is unnecessary since like parts have been indicated by like reference numerals with the exponent $b$ added to the reference numerals applied to motor 71$^b$ and with the exponent $d$ added to the reference numerals applied to motor 71$^d$.

As shown in Fig. 6, compound piston 74$^b$—75$^b$ of motor 71$^b$ does not have a passage 82 but has an axial passage 94$^b$ extending therethrough to connect cylinder 73$^b$ to recess 77$^b$. Hold-up motor 71$^b$ is otherwise the same as hold-up motor 71$^a$ but has been shown arranged opposite hand thereto. Cylinder 73$^b$ communicates with the fuel inlet passage 79 and passage 80$^b$ communicates with lubricant inlet passage 81. Recess 77$^b$ communicates with main inlet port 65 through sealing member 76$^b$ and through three passages 95 which are formed in valve 17. Only one passage 95 appears in Fig. 6 but all three are shown in Fig. 4.

The arrangement is such that fuel may flow from passage 79 through cylinder 73$^b$, passage 94$^b$, recess 77$^b$, sealing member 76$^b$ and passages 95 into port 65, and hold-up motor 71$^b$ will urge valve 17 against wear plate 16 due to spring 78$^b$ and the fuel inlet pressure acting upon the end of piston 75$^b$ and the lubricant inlet pressure acting upon the annular area on piston 74$^b$.

As shown in Fig. 8, piston 74$^d$—75$^d$ of motor 71$^d$ does not have a passage 82 but has an axial passage 94$^d$ extending therethrough to connect cylinder 73$^d$ to recess 77$^d$. Hold-up motor 71$^d$ is otherwise the same as hold-up motor 71$^a$ but has been shown arranged opposite hand thereto. Cylinder 73$^d$ communicates with the fuel discharge passage 90 and passage 80$^d$ communicates with lubricant discharge passage 91. Recess 77$^d$ communicates with main discharge port 66 through sealing member 76$^d$ and through three passages 96 which are formed in valve 17. Only one passage 96 appears in Fig. 8 but all three are shown in Fig. 4.

The arrangement is such that, when the pump is operating, the fuel discharged by pistons 29 into port 66 can flow therefrom through passages 96, sealing member 76$^d$, recess 77$^d$, passage 94$^d$ and cylinder 73$^d$ into passage 90 and hold-up motor 71$^d$ will urge valve 17 against wear plate 16 due to spring 78$^d$ and the fuel discharge pressure acting upon the end of piston 75$^d$ and the lubricant discharge pressure acting upon the annular area on piston 74$^d$.

Referring now to Fig. 9, fuel inlet passage 79 in manifold 19 is connected by channel 97 to a fuel supply such as a tank 98 which is also connected to the other five pumps as indicated by the arrows. Since the fuel is very viscous, enough pressure is maintained in tank 98 to cause the fuel to flow to the fuel pumping cylinders 25.

Lubricant inlet passage 81 in manifold 19 is connected to the outlet of gear pump 5 by a branched channel 99 which is also connected to the passages 81 in the manifolds 19 of the other five pumps and has channel 53 connected thereto. Pump 5 is supplied with lubricant from a suitable source, which has been indicated in Fig. 9 as being a reservoir 100, and it discharges lubricant into channel 99 in excess of requirements. The excess lubricant discharged by pump 5 is exhausted through a relief valve 101 which enables pump 5 to maintain in channel 99 and in passage 81 a pressure higher than the fuel pressure in passage 79.

Fuel discharge passage 90 in manifold 19 is connected by a channel 102 to a nozzle 103 through which fuel is sprayed into a combustion chamber (not shown) of a turbine.

Lubricant discharge passage 91 is connected by a channel 104 to the inlet of a pressure regulating valve 105 which has been shown in Fig. 9 as being spaced from manifold 19 but which in practice is attached to the outer face of manifold 19 as indicated by the valves 105 of pumps A1 and A2 but those valves do not appear in Fig. 3 because they are on the left of line 1—1 of Fig. 2.

Valve 105 has been shown schematically in Fig. 9 as including a body 106 having an axial bore 107 and an annular discharge port 108 formed in the wall of the bore and connected to reservoir 100 by a channel 109. Bore 107 has channel 104 connected to one end thereof and its other end connected by channel 110 to channel 102. Communication between channel 104 and port 108 is controlled by a plunger 111 which is urged toward closed position by a spring 112. When the pump is operating, plunger 111 is urged toward open position by the lubricant discharge pressure and it is urged toward closed position by spring 112 and by the fuel discharge pressure.

The portion of plunger 111 between port 108 and channel 104 is slotted so that a slight movement of plunger 111 toward the right will permit a limited flow of lubricant through valve 105 and the flow will progressively increase as plunger 111 moves toward the right. The arrangement is such that valve 105 will remain closed until the lubricant discharge pressure exceeds the fuel discharge pressure by an amount proportional to the resistance of spring 112 and then valve 105 will open but will offer enough resistance to the flow of lubricant therethrough to keep the lubricant pressure higher than the fuel pressure by an amount proportional to the resistance of spring 112.

*Operation*

The pumping mechanism has been shown with the parts thereof in the positions occupied when the mechanism is idle at which time there is no pressure to operate the hold-up motors but valves 17 are held against wear plates 16 by the hold-up motor springs 78, 78$^b$, 78$^c$ and 78$^d$. When drive shaft 7 is rotated, pump 5 and pumping units A, B and C will be driven. Units A, B and C will not discharge any fuel or lubricant because they are at zero stroke but pump 5 will draw liquid from reservoir 100 and will discharge it through relief valve 101 which will cause pump 5 to create pressure in channels 99 and 53 so that lubricant under pressure is available for operating servo-motor 41 and for filling the lubricant pumping cylinders of units A, B and C.

When the turbine regulator demands fuel, it will cause fluid to flow through channel 59 into servo-motor 41 which will cause servo-motor 41 to rotate displacement varying member 32 through a limited angular distance in a clockwise direction as previously explained, thereby putting all six pumps on stroke. Then each of the six pumps will operate as follows:

Each piston 28—29 will move outward during one-half of each revolution of cylinder barrel 15 and will be forced inward during the other half of each revolution of cylinder barrel 15. Then fuel will flow from tank 98 through channel 97, passage 79, cylinder 73$^b$, passage 94$^b$, sealing member 76$^b$, passage 95, main inlet port 65 and passages 27 into the cylinders 25 containing outward moving pistons. At the same time, lubricant will flow from pump 5 through channel 99, passages 81 and 80, cylinder 72, passage 82, sealing member 76 and passages 83 and 84 into auxiliary ports 67 and 69 and from port 69 through passages 26 into the cylinders 24 containing outward moving pistons.

The pressure created by pump 5 will cause lubricant to seep from ports 67 and 69 and form a lubricating film between the mating surfaces of valve 17 and wear plate 16 on the inlet side of the pump, and it will also cause lubricant to seep from the cylinders 24 and form lubricating films between the pistons 29 and the walls of the cylinders 25 on the inlet side of the pump.

The fuel inlet pressure in port 65 and the lubricant inlet pressure in ports 67 and 69 and the pressure in the lubricating film on the inlet side of the pump tend to move valve 17 away from wear plate 16 but that tendency is overcome by the fuel inlet pressure acting upon the ends of pistons 75 and 75$^b$ and by the lubricant inlet pressure acting upon the annular areas of pistons 74 and 74$^b$.

The inward moving pistons 28—29 will eject fuel from cylinders 25 through passages 27 into main discharge port 66 and will eject lubricant from cylinders 24 through passages 26 into auxiliary discharge port 68. The fuel discharged into port 66 will flow therefrom through passages 96, sealing member 76$^d$, passage 94$^d$, cylinder 73$^d$, passage 90, channel 102 and nozzle 103 into a combustion chamber of a turbine. Piston 29 must create enough pressure to force the fuel through nozzle 103 as fast as they eject the fuel from cylinders 25 so that the fuel discharge pressure varies in accordance with the viscosity of the fuel and the rate at which it is discharged. The fuel discharge pressure extends through channel 110 into valve 105 and assists spring 112 in urging plunger 111 toward its closed position.

The lubricant discharged into auxiliary port 68 will flow therefrom through passage 92, sealing member 76$^c$, passage 82$^c$, cylinder 72$^c$, passages 80$^c$ and 91, channel 104, valve 105 and channel 109 into reservoir 100. Due to the forces exerted by spring 112 and the fuel discharge pressure on plunger 111, valve 105 will cause pistons 28 to maintain in valve port 68 a pressure which exceeds the fuel discharge pressure by an amount proportional to the resistance of spring 112 regardless of variations in the fuel discharge pressure and which extends through passage 93 into valve port 70.

The lubricant discharge pressure will cause lubricant to seep from ports 68 and 70 and form a lubricating film between the mating surfaces of valve 17 and wear plate 16 on the discharge side of the pump, and it will also cause lubricant to seep from the cylinders 24 and form lubricating films between the pistons 29 and the walls of the cylinders 25 on the discharge side of the pump.

The fuel pressure in port 66 and the lubricant pressure in ports 68 and 70 and the pressure in the lubricating film on the outlet side of the pump tend to move valve 17 away from wear plate 16 but that tendency is overcome by the fuel discharge pressure acting upon the ends of pistons 75$^c$ and 75$^d$ and by the lubricant discharge pressure acting upon the annular areas of pistons 74$^c$ and 74$^d$.

Since the lubricant inlet pressure is always higher than the fuel inlet pressure and since the lubricant discharge pressure is always higher than the fuel discharge pressure as explained above, the pressures in the lubricating films will prevent fuel from seeping between the mating surfaces of valve 17 and wear plate 16 or between pistons 29 and the walls of cylinders 25 and thereby protect the moving parts of the pump from any abrasive action by the fuel. There will be some flow of lubricant through the films into the fuel but the flow will not be excessive if the pressure differentials are not too great. Lubricant which seeps into the fuel in this manner will be burned up with it.

Instead of maintaining the lubricant discharge pressure higher than the fuel discharge pressure by using a pressure regulating valve having a spring biased plunger such as the valve 105 shown in Fig. 9, the lubricant discharge pressure may be maintained higher than the fuel discharge pressure by using a pressure regulating valve having a differential plunger such as the valve 105$^a$ shown in Fig. 10.

Valve 105$^a$ includes a body 106$^a$ having an axial bore 107$^a$ and a counterbore 115 formed therein and an annular groove or discharge port 108$^a$ formed in the wall of bore 107$^a$. If valve 105$^a$ were substituted for valve 105, bore 107$^a$ would have channel 104 connected thereto at the left end thereof, port 108$^a$ would have exhaust channel 109 connected thereto, and counterbore 115 would have channel 110 connected thereto at the right end thereof and it would have its left end connected to drain such as by being connected to exhaust channel 109 by a branch channel 109$^a$. Communication between channel 104 and port 108$^a$ is controlled by a plunger 111$^a$ which is fitted in bore 107$^a$ and has a piston 116 arranged upon its right end and fitted in counterbore 115. The left end portion of plunger 111$^a$ is slotted in the same manner as the plunger 111 of valve 105.

With valve 105$^a$ substituted for valve 105 and the pump operating, plunger 111$^a$ would be urged toward open position by the lubricant discharge pressure acting upon its left end and it would be urged toward closed position by the fuel discharge pressure acting upon piston 116. Since the cross-sectional area of piston 116 is greater than that of plunger 111$^a$, the lubricant discharge pressure would have to exceed the fuel discharge pressure before it can move plunger 111$^a$ toward open position.

Valve 105ª would function in the same manner as valve 105 but instead of causing the lubricant discharge pressure to exceed the fuel discharge pressure by a fixed amount as does valve 105, it would maintain the lubricant discharge pressure proportional to and higher than the fuel discharge pressure.

When the turbine regulator demands less fuel, the pressure in channel 59 will drop momentarily and permit servo-motor 41 and caged spring 35 to rotate displacement varying member 32 counterclockwise to reduce the displacement of the pump, as previously explained, which will reduce the rate of flow through nozzle 103 and consequently reduce the fuel discharge pressure but the difference between the lubricant discharge pressure and the fuel discharge pressure will remain the same due to the action of spring 112.

When the turbine is shut down, the turbine regulator will cause the pressure in channel 59 to drop sufficiently to permit servo-motor 41 and caged spring 35 to return displacement varying member 35 to its neutral position.

The pumping mechanism described herein may be modified in various ways without departing from the scope of the invention which is hereby claimed as follows:

1. In a pumping mechanism, the combination of a rotatable cylinder barrel having arranged therein a plurality of main cylinders and a plurality of auxiliary cylinders, a main cylinder port communicating with each of said main cylinders and an auxiliary cylinder port communicating with each of said auxiliary cylinders, pistons fitted in said cylinders, means for effecting reciprocation of said pistons in response to rotation of said cylinder barrel, a valve engaging said cylinder barrel and having a main inlet port and a main discharge port arranged therein in the path of said main cylinder ports, means for supplying a first liquid to said main inlet port, means for conducting liquid from said main discharge port to a point of use, said valve also having two interconnected low pressure auxiliary ports arranged therein at opposite sides of said main inlet port and two interconnected high pressure auxiliary ports arranged therein at opposite sides of said main discharge port with one low pressure port and one high pressure port arranged in the path of said auxiliary cylinder ports, means for supplying a second liquid to said low pressure auxiliary ports at a pressure somewhat higher than the pressure of said first liquid, and means for conducting liquid from a high pressure auxiliary port including means for resisting the flow of liquid therethrough to thereby cause the pressure in said high pressure auxiliary ports to exceed the pressure in said main discharge port.

2. In a pumping mechanism, the combination of a rotatable cylinder barrel having arranged therein a plurality of main cylinders and a plurality of auxiliary cylinders, a main cylinder port communicating with each of said main cylinders and an auxiliary cylinder port communicating with each of said auxiliary cylinders, pistons fitted in said cylinders, means for effecting reciprocation of said pistons in response to rotation of said cylinder barrel, a valve engaging said cylinder barrel and having a main inlet port and a main discharge port arranged therein in the path of said main cylinder ports, means for supplying a first liquid to said main inlet port, means for conducting liquid from said main discharge port to a point of use, said valve also having two interconnected low pressure auxiliary ports arranged therein at opposite sides of said main inlet port and two interconnected high pressure ports arranged therein at opposite sides of said main discharge port with one low pressure port and one high pressure port arranged in the path of said auxiliary cylinder ports, means for supplying a second liquid to said low pressure auxiliary ports at a pressure somewhat higher than the pressure of said first liquid, and means for maintaining in said high pressure auxiliary ports a pressure higher than the pressure in said main discharge port including a resistance valve connected between a high pressure port and exhaust and having a spring which tends to close it and being connected to said main discharge port to enable the pressure therein to tend to close said resistance valve and thereby cause the pressure in said high pressure auxiliary ports to exceed the pressure in said main discharge port by an amount proportional to the resistance of said spring.

3. In a pumping mechanism, the combination of a rotatable cylinder barrel having arranged therein a plurality of main cylinders and a plurality of auxiliary cylinders, a main cylinder port communicating with each of said main cylinders and an auxiliary cylinder port communicating with each of said auxiliary cylinders, pistons fitted in said cylinders, means for effecting reciprocation of said pistons in response to rotation of said cylinder barrel, a valve engaging said cylinder barrel and having a main inlet port and a main discharge port arranged therein in the path of said main cylinder ports, means for supplying a first liquid to said main inlet port, means including a discharge channel for conducting liquid from said main discharge port to a point of use, said valve also having two interconnected low pressure auxiliary ports arranged therein at opposite sides of said main inlet port and two interconnected high pressure auxiliary ports arranged therein at opposite sides of said main discharge port with one low pressure port and one high pressure port arranged in the path of said auxiliary cylinder ports, means for supplying a second liquid to said low pressure auxiliary ports at a pressure somewhat higher than the pressure of said first liquid, and means for conducting liquid from a high pressure auxiliary port including a valve body having one of its ends connected thereto and to exhaust and its other end connected to said discharge channel, a plunger fitted in said body to control the flow of liquid therethrough and being urged toward its open position by the pressure in said high pressure ports and urged toward its closed position by the pressure in said main discharge port, and a spring arranged in said body for urging said plunger toward its closed position.

4. In a pumping mechanism, the combination of a rotatable cylinder barrel having arranged therein a plurality of main cylinders and a plurality of auxiliary cylinders, a main cylinder port communicating with each of said main cylinders and an auxiliary cylinder port communicating with each of said auxiliary cylinders, pistons fitted in said cylinders, means for effecting reciprocation of said pistons in response to rotation of said cylinder barrel, a valve engaging said cylinder barrel and having a main inlet port and a main discharge port arranged therein in the path of said main cylinder ports, means for supplying liquid fuel to said main inlet port, means for conducting fuel from said main discharge port to a point of use, said valve also having two interconnected low pressure auxiliary ports arranged therein at opposite sides of said main inlet port and two interconnected high pressure auxiliary ports arranged therein at opposite sides of said main discharge port with one low pressure port and one high pressure port arranged in the path of said auxiliary cylinder ports, a source of lubricant, an auxiliary pump for supplying lubricant from said source to said low pressure auxiliary ports, a relief valve connected to the outlet of said auxiliary pump for limiting the pressure in said low pressure auxiliary ports to a pressure somewhat higher than the pressure in said main inlet port, and means for conducting lubricant from a high pressure auxiliary port including a restriction having sufficient resistance to the flow of lubricant therethrough to cause the pressure in said high pressure auxiliary ports to exceed the pressure in said main discharge port.

5. In a pumping mechanism, the combination of a rotatable cylinder barrel having arranged therein a plurality of compound cylinders each comprising a main cylinder and a concentric cylinder of different diameters, a main cylinder port communicating with each of said main cylinders and an auxiliary cylinder port communicating with each of said auxiliary cylinders, a two-diameter piston fitted in each of said compound cylinders, means for effecting reciprocation of said pistons in response to rotation of said cylinder barrel, a valve engaging said cylinder barrel and having a main inlet port and a main discharge port arranged therein in the path of said main cylinder ports, means for supplying a first liquid to said main inlet port, means for conducting liquid from said main discharge port to a point of use, said valve also having two interconnected low pressure auxiliary ports arranged therein at opposite sides of said main inlet port and two interconnected high pressure auxiliary ports arranged therein at opposite sides of said main discharge port with one low pressure port and one high pressure port arranged in the path of said auxiliary cylinder ports, means for supplying a second liquid to said low pressure auxiliary ports at a pressure somewhat higher than the pressure of said first liquid, and means for conducting liquid from a high pressure auxiliary port including means for resisting the flow of liquid therethrough to thereby cause the pressure in said high pressure auxiliary ports to exceed the pressure in said main discharge port.

6. In a pumping mechanism, the combination of a rotatable cylinder barrel having arranged therein a plurality of compound cylinders each comprising a main cylinder and a concentric cylinder of different diameters, a main cylinder port communicating with each of said main cylinders and an auxiliary cylinder port communicating with each of said auxiliary cylinders, a two-diameter piston fitted in each of said compound cylinders, means for effecting reciprocation of said pistons in response to rotation of said cylinder barrel, a valve engaging said cylinder barrel and having a main inlet port and a main discharge port arranged therein in the path of said main cylinder ports, means for supplying liquid fuel to said main inlet port, means for conducting fuel from said main discharge port to a point of use, said valve also having two interconnected low pressure auxiliary ports arranged therein at opposite sides of said main inlet port and two interconnected high pressure auxiliary ports arranged therein at opposite sides of said main discharge port with one low pressure port and one high pressure port arranged in the path of said auxiliary cylinder ports, a source of lubricant, an auxiliary pump for supplying lubricant from said source to said low pressure auxiliary ports, a relief valve connected to the outlet of said auxiliary pump for limiting the pressure in said low pressure auxiliary ports to a pressure somewhat higher than the pressure in said main inlet port, and means for maintaining in said high pressure auxiliary ports a pressure higher than the pressure in said main discharge port including a resistance valve connected between a high pressure port and exhaust and having a spring which tends to close it and being connected to said main discharge port to enable the pressure therein to tend to close said resistance valve and thereby cause the pressure in said high pressure auxiliary ports to exceed the pressure in said main discharge port by an amount proportional to the resistance of said spring.

7. In a pumping mechanism, the combination of a rotatable cylinder barrel having arranged therein a plurality of main cylinders and a plurality of auxiliary cylinders, a main cylinder port communicating with each main cylinder and extending through one end of said cylinder barrel and an auxiliary cylinder port communicating with each auxiliary cylinder and extending through said end of said cylinder barrel, pistons fitted in said cylinders, means for effecting reciprocation of said pistons in response to rotation of said cylinder barrel, a flat valve engaging said end of said cylinder barrel and having a main inlet port and a main discharge port arranged therein in the path of said main cylinder ports, means for supplying a first liquid to said main inlet port, means for conducting liquid from said main discharge port to a point of use, said valve also having two interconnected low pressure auxiliary ports arranged therein at opposite sides of said main inlet port and two interconnected high pressure auxiliary ports arranged therein at opposite sides of said main discharge port with one low pressure port and one high pressure port arranged in the path of said auxiliary cylinder ports, means for supplying a second liquid to said low pressure auxiliary ports at a pressure somewhat higher than the pressure of said first liquid, and means for conducting liquid from a high pressure auxiliary port including means for resisting the flow of liquid therethrough to thereby cause the pressure in said high pressure auxiliary ports to exceed the pressure in said main discharge port.

8. A combination as set forth in claim 7 including a plurality of hold-up motors arranged at each side of the centerline of said flat valve and engaging the face of said valve opposite to said valve ports for urging said valve against said cylinder barrel, each of said motors having two separate pressure areas, means for subjecting one pressure area of each of the motors on each side of said centerline to the pressure prevailing in the main valve port on the same side of said centerline, and means for subjecting the other pressure area of each of the motors on each side of said centerline to the pressure prevailing in the auxiliary valve ports on the same side of said centerline.

9. A combination as set forth in claim 8 in which one of said hold-up motors on each side of said centerline has a passage extending therethrough and communicating with the main valve port on the same side of said centerline and another of said hold-up motors on each side of said centerline has a passage extending therethrough and communicating with the auxiliary valve ports on the same side of said centerline.

10. In a pumping mechanism, the combination of a rotatable cylinder barrel having arranged therein a plurality of main cylinders and a plurality of auxiliary cylinders, a main cylinder port communicating with each main cylinder and extending through one end of said cylinder barrel and an auxiliary cylinder port communicating with each auxiliary cylinder and extending thru said end of said cylinder barrel, pistons fitted in said cylinders, means for effecting reciprication of said pistons in response to rotation of said cylinder barrel, a flat valve engaging said end of said cylinder barrel and having a main inlet port and a main discharge port arranged therein in the path of said main cylinder ports, means for supplying liquid fuel to said main inlet port, means for conducting fuel from said main discharge port to a point of use, said valve also having two interconnected low pressure auxiliary ports arranged therein at opposite sides of said main inlet port and two interconnected high pressure auxiliary ports arranged therein at opposite sides of said main discharge port with one low pressure port and one high pressure port arranged in the path of said auxiliary cylinder ports, a source of lubricant, an auxiliary pump for supplying lubricant from said source to said low pressure auxiliary ports, a relief valve connected to the outlet of said auxiliary pump for limiting the pressure in said low pressure auxiliary ports to a pressure somewhat higher than the pressure in said main inlet port, and means for maintaining in said high pressure auxiliary ports a pressure higher than the pressure in said main discharge port including a resistance valve connected between a high pressure port and exhaust and having a spring which tends to close it and being connected to said main discharge port to enable the pressure therein to tend to close said resistance valve and thereby cause the pressure in said high pressure auxiliary ports to exceed the pressure in said main discharge port by an amount proportional to the resistance of said spring.

11. In a pumping mechanism, the combination of a rotatable cylinder barrel having arranged therein a plurality of main cylinders and a plurality of auxiliary cylinders, a main cylinder port communicating with each main cylinder and extending through one end of said cylinder barrel and an auxiliary cylinder port communicating with each auxiliary cylinder and extending thru said end of said cylinder barrel, pistons fitted in said cylinders, means for effecting reciprocation of said pistons in response to rotation of said cylinder barrel, a flat valve engaging said end of said cylinder barrel and having a main inlet port and a main discharge port arranged therein in the path of said main cylinder ports, means for supplying a first liquid to said main inlet port, means including a discharge channel for conducting liquid from said main discharge port to a point of use, said valve also having two interconnected low pressure auxiliary ports arranged therein at opposite sides of said main inlet port and two interconnected high pressure auxiliary ports arranged therein at opposite sides of said main discharge port with one low pressure port and one high pressure port arranged in the path of said auxiliary cylinder ports, means for supplying a second liquid to said low pressure auxiliary ports at a pressure somewhat higher than the pressure of said first liquid, and means for conducting liquid from a high pressure auxiliary port including a valve body having one of its ends connected thereto and its other end connected to said discharge channel, a plunger fitted in said body to control the flow of liquid therethrough and being urged toward its open position by the pressure in said high pressure ports and urged toward its closed position by the pressure in said main discharge port, and a spring arranged in said body for urging said plunger toward its closed position.

12. In a pumping mechanism, the combination of a rotatable cylinder barrel having arranged therein a plurality of compound cylinders each comprising a main cylinder and a concentric cylinder of different diameters, a main cylinder port communicating with each main cylinder and extending through one end of said cylinder barrel and an auxiliary cylinder port communicating with each auxiliary cylinder and extending through said end of said cylinder barrel, a two-diameter piston fitted in each of said compound cylinders, means for effecting reciprocation of said pistons in response to rotation of said cylinder barrel, a flat valve engaging said end of said cylinder barrel and having a main inlet port and a main discharge port arranged therein in the path of said main cylinder ports, means for supplying a first liquid to said main inlet port, means for conducting liquid from said main discharge port to a point of use, said valve also having two interconnected low pressure auxiliary ports arranged therein at opposite sides of said main inlet port and two interconnected high pressure auxiliary ports arranged therein at opposite sides of said main discharge port with one low pressure port and one high pressure port arranged in the path of said auxiliary cylinder ports, means for supplying a second liquid to said low pressure auxiliary ports at a pressure somewhat higher than the pressure of said first liquid, and means for conducting liquid from a high pressure auxiliary port including a restricting having sufficient resistance to the flow of liquid therethrough to cause the pressure in said high pressure auxiliary ports to exceed the pressure in said main discharge port.

13. A combination as set forth in claim 12 including a plurality of hold-up motors arranged at each side of the centerline of said flat valve and engaging the face of said valve opposite to said valve ports for urging said valve against said cylinder barrel, each of said motors having two separate pressure areas, means for subjecting one pressure area of each of the motors on each side of said centerline to the pressure prevailing in the main valve port on the same side of said centerline, and means for subjecting the other pressure area of each of the motors on each side of said centerline to the pressure prevailing in the auxiliary valve ports on the same side of said centerline.

14. In a pumping mechanism, the combination of a rotatable cylinder barrel having arranged therein a plurality of compound cylinders each comprising a main cylinder and a concentric cylinder of different diameters, a main cylinder port communicating with each main cylinder and extending through one end of said cylinder barrel and an auxiliary cylinder port communicating with each auxiliary cylinder and extending through said end of said cylinder barrel, a two-diameter piston fitted in each of said compound cylinders, means for effecting reciprocation of said pistons in response to rotation of said cylinder barrel, a flat valve engaging said end of said cylinder barrel and having a main inlet port and a main discharge port arranged therein in the path of said main cylinder ports, means for supplying liquid fuel to said main inlet port, means for conducting fuel from said main discharge port to a point of use, said valve also having two interconnected low pressure auxiliary ports arranged therein at opposite sides of said main inlet port and two interconnected high pressure auxiliary ports arranged therein at opposite sides of said main discharge port with one low pressure port and one high pressure port arranged in the path of said auxiliary cylinder ports, a source of lubricant, an auxiliary pump for supplying lubricant from said source to said low pressure auxiliary ports, a relief valve connected to the outlet of said auxiliary pump for limiting the pressure in said low pressure auxiliary ports to a pressure somewhat higher than the pressure in said main inlet port, and means for maintaining in said high pressure auxiliary ports a pressure higher than the pressure in said main discharge port including a resistance valve connected between a high pressure port and exhaust and having a spring which tends to close it and being connected to said main discharge port to enable the pressure therein to tend to close said resistance valve and thereby cause the pressure in said high pressure auxiliary ports to exceed the pressure in said main discharge port by an amount proportional to the resistance of said spring.

15. A combination as set forth in claim 14 including a plurality of hold-up motors arranged at each side of the centerline of said flat valve and engaging the face of said valve opposite to said valve ports for urging said valve against said cylinder barrel, each of said motors having two separate pressure areas, means for subjecting one pressure area of each of the motors on each side of said centerline to the pressure prevailing in the main valve port on the same side of said centerline, and means for subjecting the other pressure area of each of the motors on each side of said centerline to the pressure prevailing in the auxiliary valve ports on the same side of said centerline.

16. A pumping mechanism, comprising a casing, a plurality of cylinder barrels arranged within and rotatably supported by said casing, pistons and cylinders arranged radially in said cylinder barrels, non-rotatable valve means engaging each of said cylinder barrels to control the flow of liquid to and from the cylinders therein, a drive shaft journaled in said casing, a drive connecting said cylinder barrels to said shaft for rotating said cylinder barrels in unison in response to rotation of said shaft, a displacement varying member arranged within and supported by said casing, a thrust member extending around each cylinder barrel in contact with the pistons therein and carried by said displacement varying member, and means for adjusting said displacement varying member to move the axes of said thrust members relatively to the axes of said cylinder barrels to thereby effect reciprocation of all of said pistons in response to said cylinder barrels being rotated and said displacement varying member being adjusted to offset the axes of said thrust members from the axes of said cylinder barrels.

17. A pumping mechanism, comprising a casing, a plurality of cylinder barrels arranged within and rotatably supported by said casing, a plurality of pistons and cylinders arranged radially in each of said cylinder barrels in two circular rows, each of said cylinder barrels having a valve port extending from each cylinder therein through the end of the cylinder barrel adjacent to that cylinder, a flat valve engaging each end of each cylinder barrel and cooperating with the cylinder ports therein to control the flow of liquid to and from said cylinders, a drive shaft journaled in said casing, a drive connecting said cylinder barrels to said shaft for rotating said cylinder barrels in unison in response to rotation of said shaft, a displacement varying member arranged within and supported by said casing, a thrust member extending around each cylinder barrel in contact with the pistons therein and carried by said displacement varying member, and means for adjusting said displacement varying member to move the axes of said thrust members relatively to the axes of said cylinder barrels to thereby effect reciprocation of all of said pistons in response to said cylinder barrels being rotated and said displacement varying member being adjusted to offset the axes of said thrust members from the axes of said cylinder barrels.

18. A pumping mechanism, comprising a casing, a drive shaft journaled in said casing, a plurality of cylinder barrels arranged within and rotatably supported by said casing and spaced around said shaft, a plurality of pistons and cylinders arranged radially in each of said cylinder barrels in two circular rows, each of said cylinder barrels having a valve port extending from each cylinder therein through the end of the cylinder barrel adjacent to that cylinder, a flat valve engaging each end of each cylinder barrel and cooperating with the cylinder ports therein to control the flow of liquid to and from said cylinders, a drive connecting said cylinder barrels to said shaft for rotating said cylinder barrels in unison in response to rotation of said shaft, a displacement varying member arranged within and rotatably supported by said casing, a thrust member extending around each cylinder barrel in contact with the pistons therein and carried by said displacement varying member, and means for rotating said displacement varying member through limited angular distances to move the axes of said thrust members relatively to the axes of said cylinder barrels to thereby effect reciprocation of all of said pistons in response to said cylinder barrels being rotated and said displacement varying member being rotated from its neutral position to offset the axes of said thrust members from the axes of said cylinder barrels.

19. A pumping mechanism, comprising a casing, a drive shaft journaled in said casing, a plurality of cylinder barrels arranged within and rotatably supported by said casing and spaced around said shaft, each of said cylinder barrels having a plurality of main cylinders and a plurality of auxiliary cylinders arranged radially in each half thereof, a main cylinder port extending from each main cylinder through the adjacent end of said cylinder barrel and an auxiliary cylinder port extending from each auxiliary cylinder through the adjacent end of said cylinder barrel, pistons fitted in said cylinders, a flat valve engaging each end of each cylinder barrel and cooperating with the cylinder ports therein to control the flow of liquid to and from said cylinders, a drive connecting said cylinder barrels to said shaft for rotating said cylinder barrels in unison in response to rotation of said shaft, a displacement varying member arranged within and rotatably supported by said casing, a thrust member extending around each cylinder barrel in contact with the pistons therein and carried by said displacement varying member, and means for rotating said displacement varying member through limited angular distances to move the axes of said thrust members relatively to the axes of said cylinder barrels to thereby effect reciprocation of all of said pistons in response to said cylinder barrels being rotated and said displacement varying member being rotated from its neutral position to offset the axes of said thrust members from the axes of said cylinder barrels.

20. A pumping mechanism according to claim 19 in which each of said valves has a main inlet port and a main discharge port arranged therein in the path of said main cylinder ports, two interconnected low pressure auxiliary ports arranged therein at opposite sides of said main inlet port and two interconnected high pressure auxiliary ports arranged therein at opposite sides of said main discharge port with one low pressure port and one high pressure port arranged in the path of said auxiliary cylinder ports and which includes means for supplying a first liquid to said main inlet port, means for conducting liquid from said main discharge port to a point of use, means for supplying a second liquid to said low pressure auxiliary ports at a pressure somewhat higher than the pressure of said first liquid, and means for conducting liquid from a high pressure auxiliary port including a restriction having sufficient resistance to the flow of liquid therethrough to cause the pressure in said high pressure auxiliary ports to exceed the pressure in said main discharge port.

References Cited in the file of this patent

UNITED STATES PATENTS

| | | |
|---|---|---|
| 1,506,892 | Egersdorfer | Sept. 2, 1924 |
| 1,998,984 | Ferris | Apr. 23, 1935 |
| 2,256,459 | Kendricks | Sept. 16, 1941 |
| 2,365,234 | Wineman | Dec. 19, 1944 |
| 2,462,931 | Anderson | Mar. 1, 1949 |
| 2,550,966 | Buchanan | May 1, 1951 |
| 2,557,508 | Leibing | June 19, 1951 |
| 2,581,764 | Leibing | Jan. 8, 1952 |
| 2,608,933 | Ferris | Sept. 2, 1952 |